United States Patent [19]

Athey

[11] Patent Number: 4,806,435
[45] Date of Patent: Feb. 21, 1989

[54] SEAM FOR INPENETRABLE MATERIAL

[76] Inventor: Robert D. Athey, P.O. Drawer 1459, El Cerrito, Calif. 94530

[21] Appl. No.: 140,383

[22] Filed: Jan. 4, 1988

[51] Int. Cl.$^4$ ............................................... B32B 3/10
[52] U.S. Cl. ................................... 428/594; 428/626; 428/457; 405/270; 52/408; 52/468
[58] Field of Search .................. 428/594, 626, 457; 52/408, 468; 405/128, 270, 38, 176

[56]  References Cited
U.S. PATENT DOCUMENTS

| 4,588,646 | 5/1986 | Athey, Jr. ............... | 428/457 |
| 4,589,804 | 5/1986 | Paeglis et al. ............ | 405/270 |

Primary Examiner—L. Dewayne Rutledge
Assistant Examiner—George Wyszomierski
Attorney, Agent, or Firm—Bielen & Peterson

[57]  ABSTRACT

A seal for connecting abutting first and second elastomeric sheets having overlying metallic portions including an elastomeric strip. The elastomeric strip is bonded to the elastomeric portions of the first and second sheets. A metallic plug is attached to the metallic portion of the abutting sheets and is itself covered by a layer of flexible and abrasion resistant material which adheres to the metallic plug and the metallic portions of the abutting sheets.

3 Claims, 1 Drawing Sheet

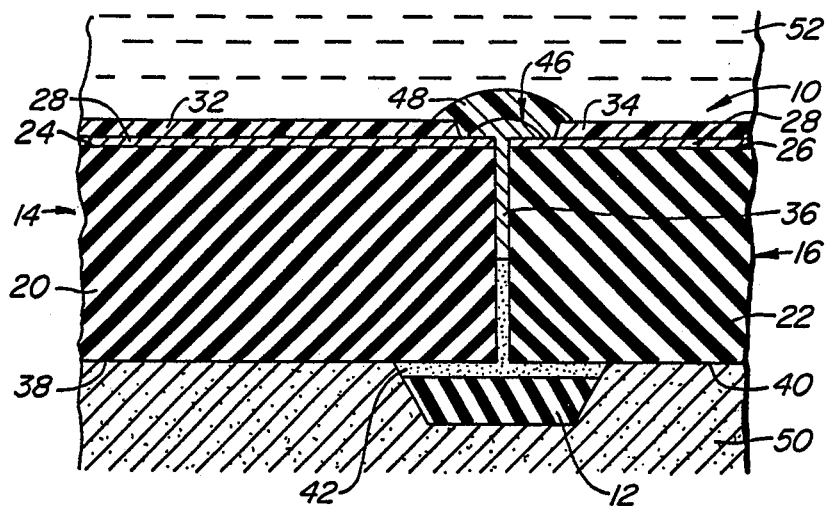
FIG._1.
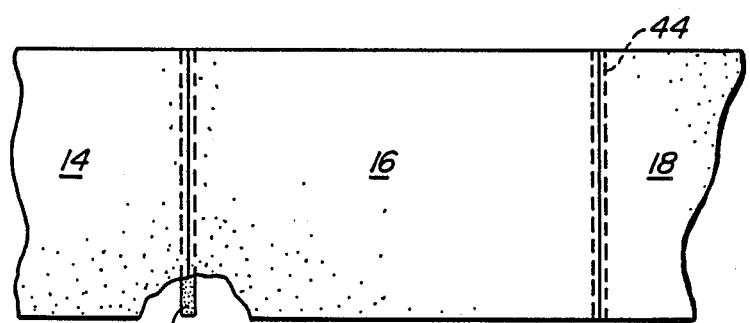
FIG._2.
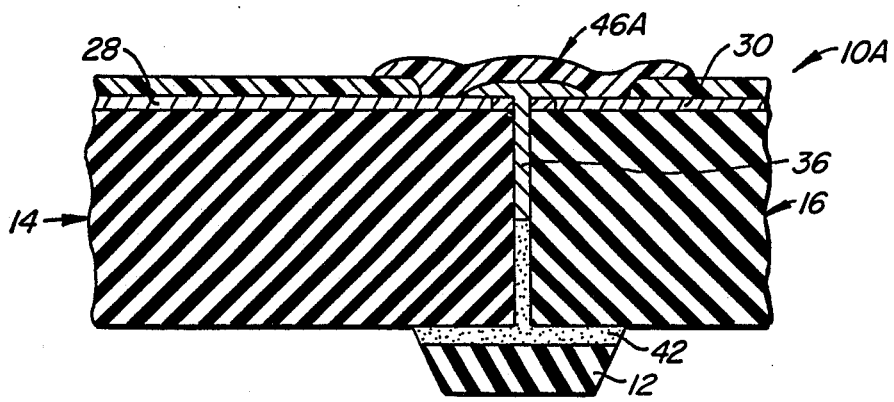
FIG._3.
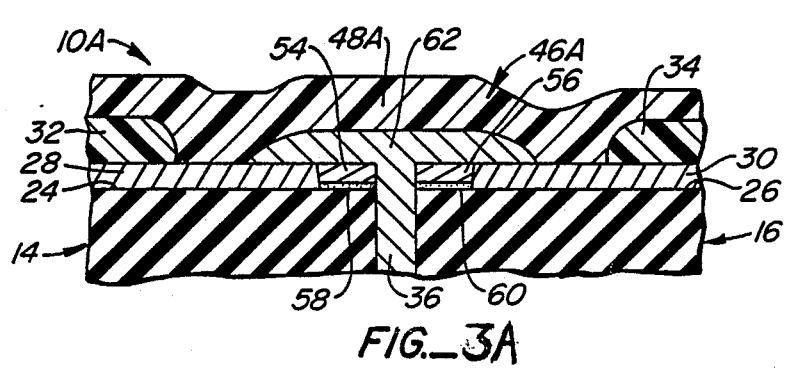
FIG._3A

SEAM FOR INPENETRABLE MATERIAL

BACKGROUND OF THE INVENTION

The present invention relates to a novel seal for connecting abutting first and second sheets of laminated elastomeric and metallic materials.

Toxic chemicals may be found in a liquid medium and confined to a settling pond or tank. Often, such settling ponds are of earthen construction requiring liners to prevent the migration of toxic chemicals into the underlying soil and strata. It has been found that plastic materials for liners often permit the passage of hazardous chemicals therethrough. In addition, seams between sheets of plastic material are subject to breakage due to shifting subsurface phenomenon i.e.: earthquakes, land slides, and the like.

Reference is made to U.S. Pat. No. 4,588,646 which describes a protective sheet which may be employed as an article of clothing. Such protective sheet may also be employed to line hazardous waste ponds. A method of seaming such protective sheets would be a great advance in the field of hazardous waste handling and transportation.

SUMMARY OF THE INVENTION

In accordance with the present invention a novel and useful sealing and method for seaming metalized elastomeric sheets is provided.

The seal of the present invention utilizes an elastomeric strip which is attached by adhesive to the undersides of the abutting sheets lacking the overlying metallic portions. Adhesive may travel to the vertical space between the abutting sheets.

A metallic plug attaches to the overlying metallic portions of the top side of the abutting sheets and is intended for contacting the toxic material when used as a pond liner. The metallic plug may simply be a molten metal which is hardened to adhere to the metallic portion. Where the metallic layer of the abutting sheets has been omitted, worn, or removed, the metallic plug may, in part, take the form of metallic strips which are attached by adhesive to the elastomeric material along the seam joining the two sheets. Molten metallic material is then poured or spread over the metallic strips and attached thereto when hardened.

A layer of flexible and abrasion resistant material is then attached or applied as a coating over the metallic plug and the metallic portions of the abutting sheets.

It has been found that the seal hereinabove described may be applied, in situ, manually or by automatic means. It should also be noted that metallic material presents a formidable barrier to the migration of the toxic material, yet the seal of the present invention possesses flexibility which may accomodate shifting of the underlying surface material.

BRIEF DESCRIPTION OF THE DRAWINGS

FIG. 1 is a partial sectional view of one embodiment of the present invention.

FIG. 2 is a top plan view of a portion of the present invention showing the bottom elastomeric strip in place on a number of sheets.

FIG. 3 is a partial sectional view of another embodiment of the present invention employing metallic strips as a portion of the metallic plug.

FIG. 3a is an enlarged partial sectional view of the metallic plug portion of FIG. 3.

DESCRIPTION OF THE PREFERRED EMBODIMENTS

Various aspects of the present invention will evolve from the following detailed description of the preferred embodiments of the present invention which should be referenced to the hereinabove described drawings.

The invention as a whole is shown in the drawings by reference character 10, or by a letter following reference character 10 when alternate embodiments are being described. Seal 10, FIG. 1, includes as one of its elements an elastomeric strip 12 which may be formed of butyl rubber, neoprene, and the like. Elastomeric strip 12 is used in conjunction with sheets 14, 16 and 18, FIGS. 1 and 2. With reference to FIG. 1 it may be seen that sheets 14 and 16 include an elastomeric portion 20 and 22, respectively. Surfaces 24 and 26 of sheets 14 and 16, respectively, include thin metallic layers 28 and 30, respectively. Layers or coatings 32 and 34 of flexible and abrasion resistant material such as lacquer or varnish, cover metallic layers 28 and 30. As may be surmised, the sheets 14 and 16 in FIG. 1 show the removal or absence of coats 32 and 34 adjacent the seam 36 at the abutment of sheets 14 and 16. Coats of 32 and 34 in this area may be purposefully omitted during the manufacture of sheets 14 and 16 or by physical removal after the manufacturing of sheets 14 and 16.

Elastomeric strip 12 is attached to surfaces 38 and 40 of sheets 14 and 16, respectively, by the use of adhesive 42, which may be contact cement or other known adhesives used for attaching elastomers to one another. It should be noted that adhesive 42 may travel into seam 36 between abutting sheets 14 and 16. With reference to FIG. 2, elastomeric strip 12 and another elastomeric strip 44 is depicted for connecting the undersurfaces of sheets 14, 16 and 18 to one another. Thus, a multiplicity of sheets such as sheets 14, 16 and 18 may be adjoined in this manner.

The present invention also includes provision for a metallic plug 46, which is preferably of the same metallic composition as thin metallic layers 28 and 30, FIG. 1. Metallic plug, FIG. 1, may take the form of a molten metallic material, such as lead, copper, gold, and the like which is poured along surfaces 24 and 26 of sheets 14 and 16 along seam 36. Upon hardening, metallic plug 46 adheres to metallic layers 28 and 30 and may enter seam 36. A layer 48 of flexible and abrasion resistant material, such as a lacquer, varnish and the like, is applied over the top of metallic plug 46 and over, or adjacent, layers 32 and 34 of sheets 14 and 16. The sheets 14 and 16 lie on a ground surface 50 such that the surfaces 38 and 40 contact ground surface 50. Liquid body 52 lies in intimate contact with coatings 32 and 34, as well as layer 48 above metallic plug 46. Any toxic materials found in liquid body 52 must migrate through lacquer or varnish layers, metallic layers, and finally, elastomeric layers before reaching ground strata 50. It should be noted that shifting of ground strata 50 will be largely ameliorated by the elasticity inherent in sheets 14 and 16.

With reference to FIGS. 3 and 3a, it may be observed that an alternate embodiment 10a of the invention is depicted therein for use with sheets 14 and 16. As in the prior embodiment, elastomeric strip 12 is attached to sheets 14 and 16 via adhesive layer 42. Metallic plug 46a includes a pair of metallic strips 54 and 56 which extend along seam 36 between abutting sheets 14 and 16. Metallic strips 54 and 56 are attached to surfaces 24 and 26 by the use of adhesive layers and 60 which may be a contact cement, similar to adhesive 42. Molten metallic material 62 is applied over metallic strips 54 and 56 as well as metallic layers 28 and 30 for adherence thereto upon cooling and hardening. A lacquer or varnish layer 48a is then applied to the top of molten metallic material 62 after hardening. It should be noted that lacquer layer 48a may override or abut lacquer (or varnish) coats 32 and 34.

In order to describe the invention more completely the following examples are given without intending to limit the invention to the specific examples set forth therein except as such as they appear as limitations in the appended claims.

EXAMPLE I

Two butyl rubber sheets were seamed together edge-to-edge by using contact cement sold under the trademark "Duro". A strip of butyl rubber was bonded along and over the abutting edges of the two butyl rubber sheets on one side of the pair of rubber sheets. The contact cement interfaced the edges of the two butyl rubber sheets and the overlying strip of butyl rubber. Several one inch strips of lead foil, 4 mils thick, 3 inches wide were attached to the other side of the bonded butyl rubber sheets by use of the same contact cement. The lead foil strips extended along either side of the seam between the bonded sheets. Lead in a Pyrex glass dish was heated to 350° C. and melted. The liquid lead was poured atop the lead foil strips along the junction between the butyl rubber sheets. The molten lead hardened on cooling and adhered well to the lead foil strips. The surface of the hardened molten lead and the lead foil were coated with a pigmented aqueous polyurethane.

EXAMPLE II

Two butyl rubber sheets are laminated on one side with a thin layer of lead. The lead is coated by a polyurethane lacquer. Both sheets are placed edge-to-edge with the lacquer coating oriented on the upper surface. A strip of butyl rubber is bonded with contact cement to the underside of the two sheets over-lapping the seam between the two sheets, which also travels into the space between the abutting edges of the two sheets. Lacquer is removed along the upper surfaces of the sheets immediately adjacent the separating seam to reveal the underlying butyl rubber surface. Lead foil strips are bonded to the butyl rubber with contact cement another side of the seam. Molten lead is poured on the lead foil strips and adheres to the strip upon cooling. The cooled molten lead and adjacent lead foil is coated with an aqueous polyurethane, which also extends over the polyurethane coating on the upper surface of the two sheets.

What is claimed is:

1. A seal for connecting abutting first and second sheets each having an elastomeric portion and an elastomeric surface on one side and an overlying metallic portion on the other side thereof comprising:
   a. an elastomeric stip;
   b. adhesive for attaching said elastomeric strip to said elastomeric portions of the one sides of the first and second sheets;
   c. a metallic plug attached to the overlying metallic portions of the other sides of the abutting sheets; and
   d. a layer of flexible and abrasion resistant, material attached to overlying metallic portions of the abutting sheets and said metallic plug attached to said overlying metallic portions of the abutting sheets.

2. The seal of claim 1 in which said metallic plug includes a first and second metallic strip, said first metallic strip being attached to the elastomeric portion of the first sheet, said second metallic strip being attached to the elastomeric portion of the second sheet.

3. The seal of claim 2, in which said metallic plug further comprises a cast metallic component hardened to adhere to said first and second metallic strips.

* * * * *